US012769244B2

(12) United States Patent
Ishida

(10) Patent No.: US 12,769,244 B2
(45) Date of Patent: Oct. 20, 2026

(54) DRIVE TRANSMISSION DEVICE AND IMAGE FORMING APPARATUS

(71) Applicant: KYOCERA Document Solutions Inc., Osaka (JP)

(72) Inventor: Hirotaka Ishida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/026,151

(22) Filed: Jan. 16, 2025

(65) Prior Publication Data

US 2025/0237990 A1 Jul. 24, 2025

(30) Foreign Application Priority Data

Jan. 22, 2024 (JP) ................................ 2024-007186

(51) Int. Cl.
*G03G 15/00* (2006.01)
*G03G 21/16* (2006.01)

(52) U.S. Cl.
CPC ....... *G03G 15/757* (2013.01); *G03G 21/1633* (2013.01); *G03G 21/1647* (2013.01)

(58) Field of Classification Search
CPC ............. G03G 15/757; G03G 21/1633; G03G 21/1647
USPC ................................................. 399/110, 167
See application file for complete search history.

(56) References Cited

U.S. PATENT DOCUMENTS 11,867,268 B2 * 1/2024 Mizuno .................. F16H 35/06
2022/0236686 A1 7/2022 Mizuno

FOREIGN PATENT DOCUMENTS

JP 2013-061403 A 4/2013

OTHER PUBLICATIONS

The extended European search report issued by the European Patent Office on Jun. 12, 2025, which corresponds to European Patent Application No. 25152150.6-1001 and is related to U.S. Appl. No. 19/026,151.

* cited by examiner

*Primary Examiner* — Hoan H Tran
(74) *Attorney, Agent, or Firm* — Studebaker Brackett PLLC

(57) ABSTRACT

A drive transmission device is arranged to face a drive transmitted portion across a metal plate. The drive transmission device includes a gear part, a coupling part, a biasing member and a retracting part. The gear part rotates around an axis. The coupling part penetrating a through-hole of the metal plate is connected to the drive transmitted portion, and rotates around the same axis of the gear part. The biasing member biases the gear part and the coupling part to a direction close to the drive transmitted portion. The retracting part through which the coupling part penetrates rotates around the same axis as the coupling part in a reciprocating manner. The metal plate has two inclined parts which are arranged across the through-hole, and protrude in a direction away from the drive transmitted portion. The inclined part is formed by deforming a part of the metal plate.

7 Claims, 10 Drawing Sheets

DRIVE TRANSMISSION DEVICE AND IMAGE FORMING APPARATUS

INCORPORATION BY REFERENCE

This application is based on and claims the benefit of priority from Japanese patent application No. 2024-007186 filed on Jan. 22, 2024, which is incorporated by reference in its entirety.

BACKGROUND

The present disclosure relates to a drive transmission device and an image forming apparatus.

A main body side drive unit for transmitting a driving force to a photosensitive drum of an image forming apparatus is known. An axial center (coupling) of a drive input gear of the main body side drive unit is supported by a bearing attached to a main body frame sheet metal. The main body side drive unit includes a lock member having a cam portion, and the bearing has another cam portion which is in contact with the cam portion of the lock member. The cam portion of the lock member is turned in a reciprocating manner while in contact with the cam portion of the bearing such that the main body side drive unit is coupled and uncoupled to the photosensitive drum.

Incidentally, in the image forming apparatus, in order to form a good image, it is required to rotate the photosensitive drum with high accuracy without causing vibration (shaft deviation). In order to rotate the photosensitive drum with high accuracy, it is effective to connect the axial center (coupling) of the drive input gear as close as possible to the photosensitive drum.

However, in the above-described technique, since the bearing having the cam portion is attached to the body frame sheet metal, the axial center (coupling) of the drive input gear must be extended by a thickness of the bearing. Therefore, in the above-described technique, the photosensitive drum tends to vibrate easily, and a good image cannot be formed. Further, in the above-described technique, it is necessary to prepare the bearing that is a separate part from the body frame sheet metal, or to attach the bearing to the body frame sheet metal, thereby increasing the manufacturing cost of the body side drive unit.

SUMMARY

A drive transmission according to the present disclosure is arranged to face a drive transmitted portion across a metal plate. The drive transmission device includes a gear part, a coupling part, a biasing member and a retracting part. The gear part is coupled to a drive source, and rotates around an axis by a driving force of the drive source. The coupling part is formed into a cylindrical shape, penetrates a through-hole of the metal plate, is connected to the drive transmitted portion, and rotates around the same axis of the gear part. The biasing member biases the gear part and the coupling part to a direction close to the drive transmitted portion. The retracting part is formed into an annular shape through which the coupling part penetrates, and rotates around the same axis as the coupling part in a reciprocating manner. The metal plate has at least two inclined parts which are arranged across the through-hole, and protrude in a direction away from the drive transmitted portion. The inclined part is formed by deforming a part of the metal plate. The retracting part rotates in one direction while in contact with the inclined part to move the gear part and the coupling part in the direction away from the drive transmitted portion against a biasing force of the biasing member.

An image forming apparatus according to the present disclosure includes the drive transmission device according The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Figure 1:
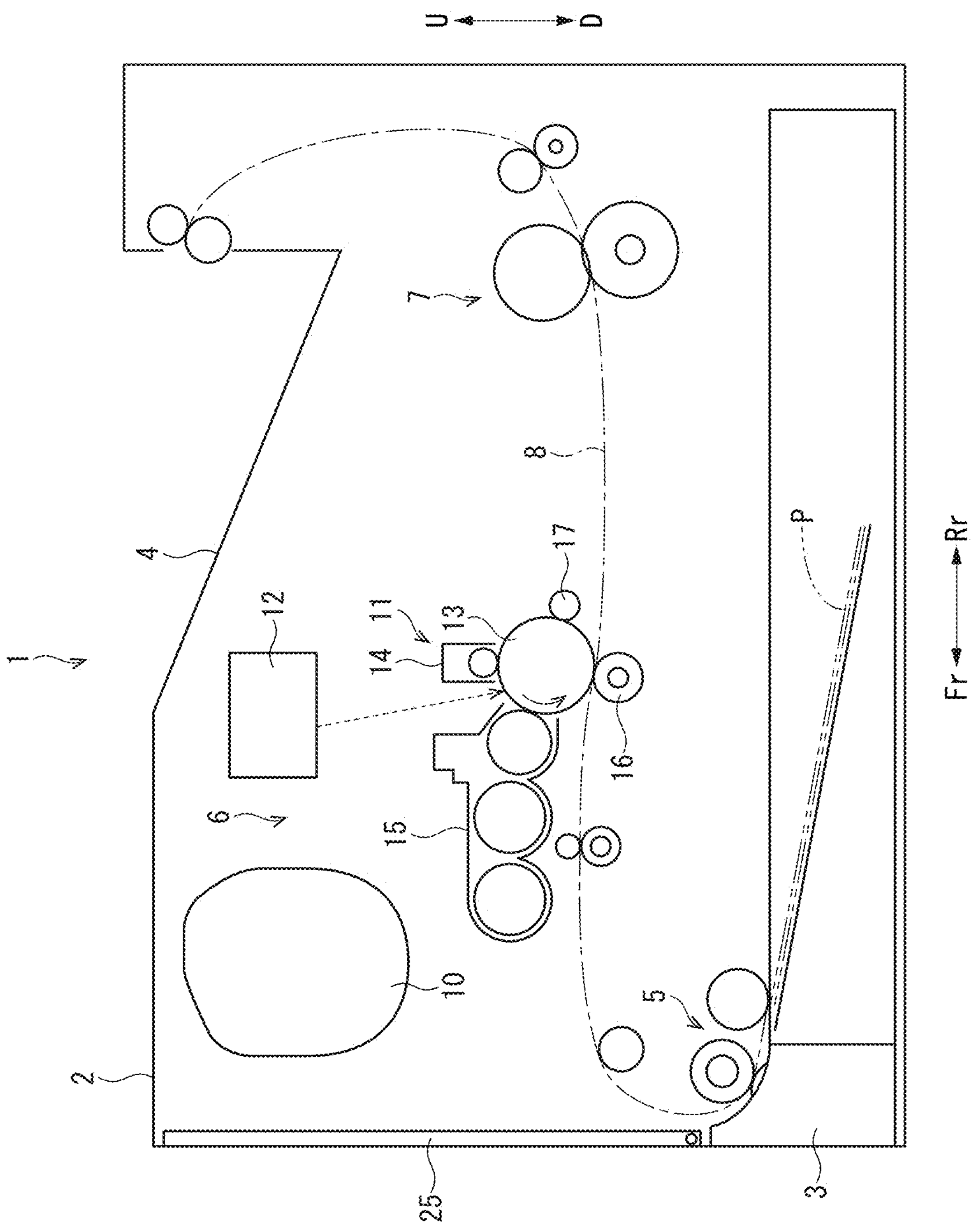
FIG. 1 is a schematic view (side view) showing an internal structure of an image forming apparatus according to one embodiment of the present disclosure.

With reference to the attached drawings, embodiments of the present disclosure will be described below. Fr, Rr, L, R, U and D shown in the drawings indicate the front, rear, left, right, upper and lower. Although terms showing direction and position are used herein, these terms are used for convenience of description and do not limit the technical scope of the present disclosure.

[Image forming apparatus] With reference to FIG. 1, the image forming apparatus 1 will be described. FIG. 1 is a schematic view (side view) showing an internal structure of the image forming apparatus 1.

The image forming apparatus 1 forms an image on a sheet P by an electrophotographic method. The image forming apparatus 1 includes an apparatus main body 2 constituting a substantially rectangular parallelepiped appearance. In the lower portion in the apparatus main body 2, a sheet feeding cassette 3 in which sheets P (medium) are stored is provided. On the upper surface of the apparatus main body 2, a sheet discharge tray 4 on which the image-formed sheet P is received is provided. A conveyance path 8 along which the sheet P is conveyed from the sheet feeding cassette 3 to the sheet discharge tray 4 is formed inside the apparatus main body 2. A sheet feeding device 5 is provided at the upstream end of the conveyance path 8, an image forming device 6 is provided at the midstream portion of the conveyance path 8, and a fixing device 7 is provided at the downstream portion of the conveyance path 8. The sheet P is not limited to a paper sheet but may be made of resin or the like.

The image forming device 6 includes a toner container 10, a drum unit 11, and an optical scanner 12. The toner container 10 contains, for example, black toner (developer). The drum unit 11 includes a photosensitive drum 13 and a charging device 14. The charging device 14, a developing device 15, a transfer roller 16 and a cleaning device 17 are arranged around the photosensitive drum 13 in the order of the image forming process. The transfer roller 16 is in contact with the photosensitive drum 13 from the lower side to form a transfer nip. The toner may be a two-component developer in which toner and carrier are mixed, or a one-component developer composed of magnetic toner.

The image forming apparatus forms an image on the sheet P based on image data outputted from an external terminal (personal computer, or the like). A control part (not shown) provided in the image forming apparatus 1 controls the image forming apparatus 1 based on the input image data, and the image forming process is executed as follows.

The charging device 14 charges the surface of the photosensitive drum 13. The photosensitive drum 13 is irradiated with scanning light emitted from the optical scanner 12, and carries an electrostatic latent image. The developing device 15 develops the electrostatic latent image on the photosensitive drum 13 into a toner image by using the toner supplied from the toner container 10. The sheet P is fed from the sheet feeding cassette 3 to the conveyance path 8 by the sheet feeding device 5, and the toner image on the photosensitive drum 13 is transferred to the sheet P passing through the transfer nip. The fixing device 7 thermally fixes the toner image to the sheet P. Thereafter, the sheet P is discharged to the sheet discharge tray 4. The cleaning device 17 removes the toner remaining on the surface of the photosensitive drum 13.

Figure 2:
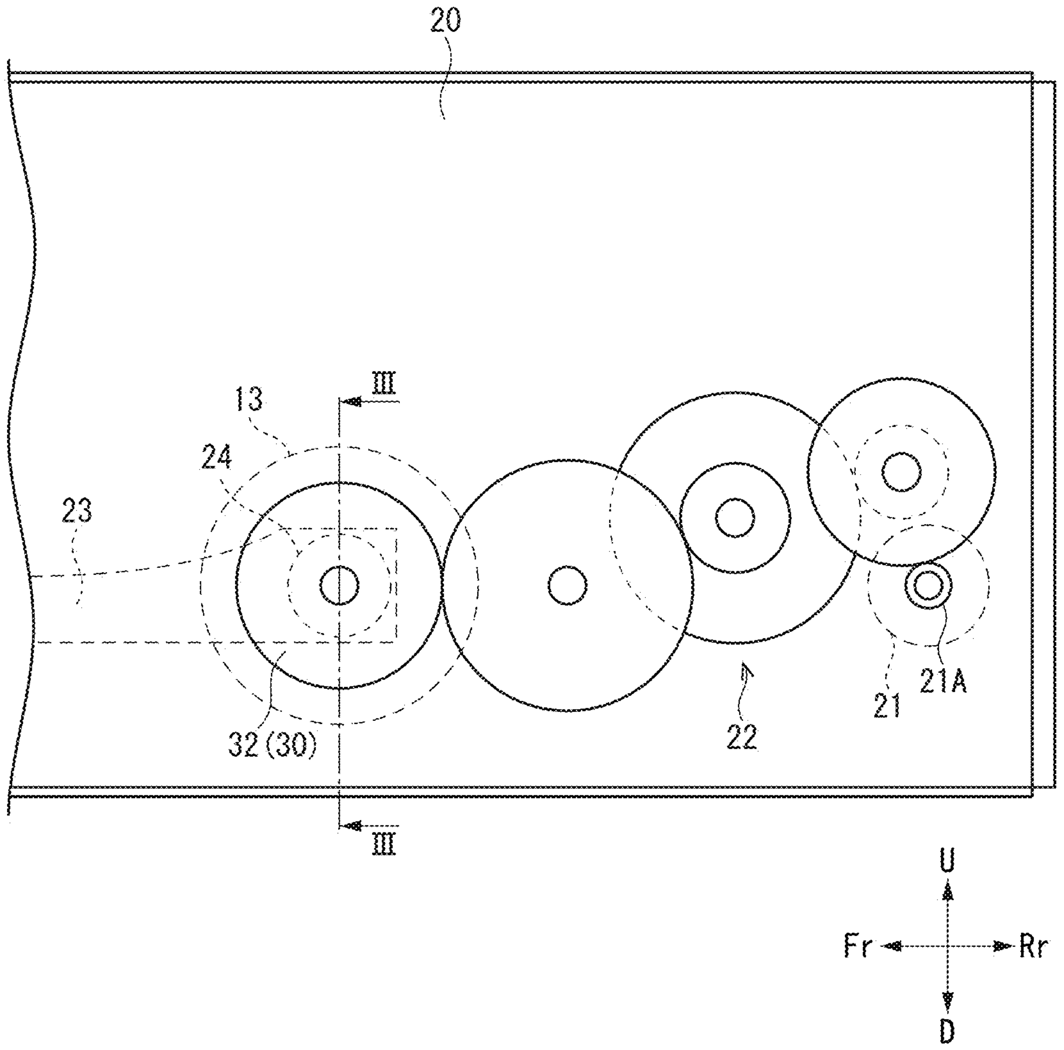
FIG. 2 is a schematic view (side view) showing a drive transmission device and a main body sheet metal according to the embodiment of the present disclosure.
Figure 3:
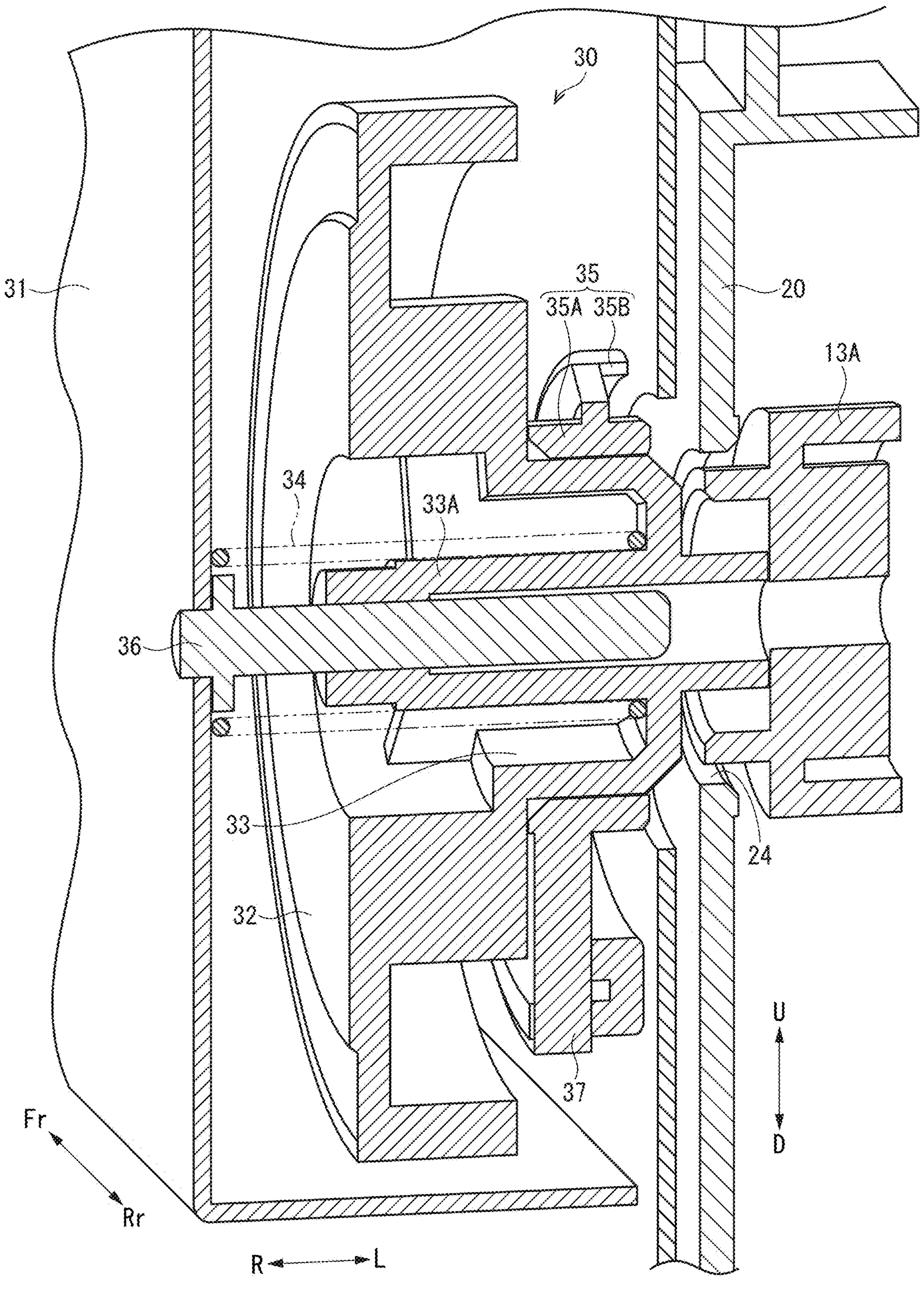
FIG. 3 is a cross-sectional view taken along the line III-III of FIG. 2.
Figure 4:
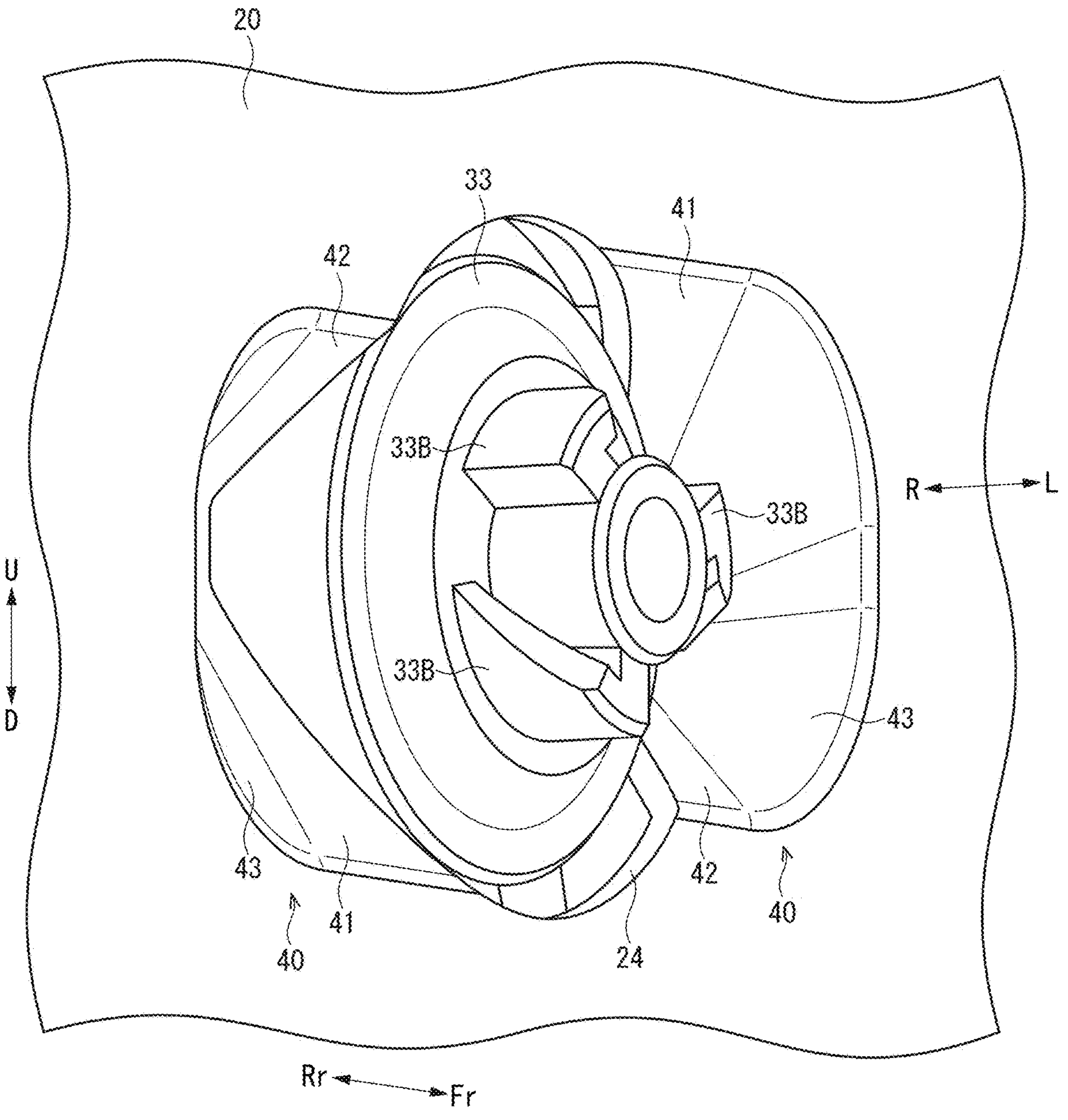
FIG. 4 is a perspective view showing a coupling portion and the main body sheet metal of the drive transmission device according to the embodiment of the present disclosure.
Figure 5:
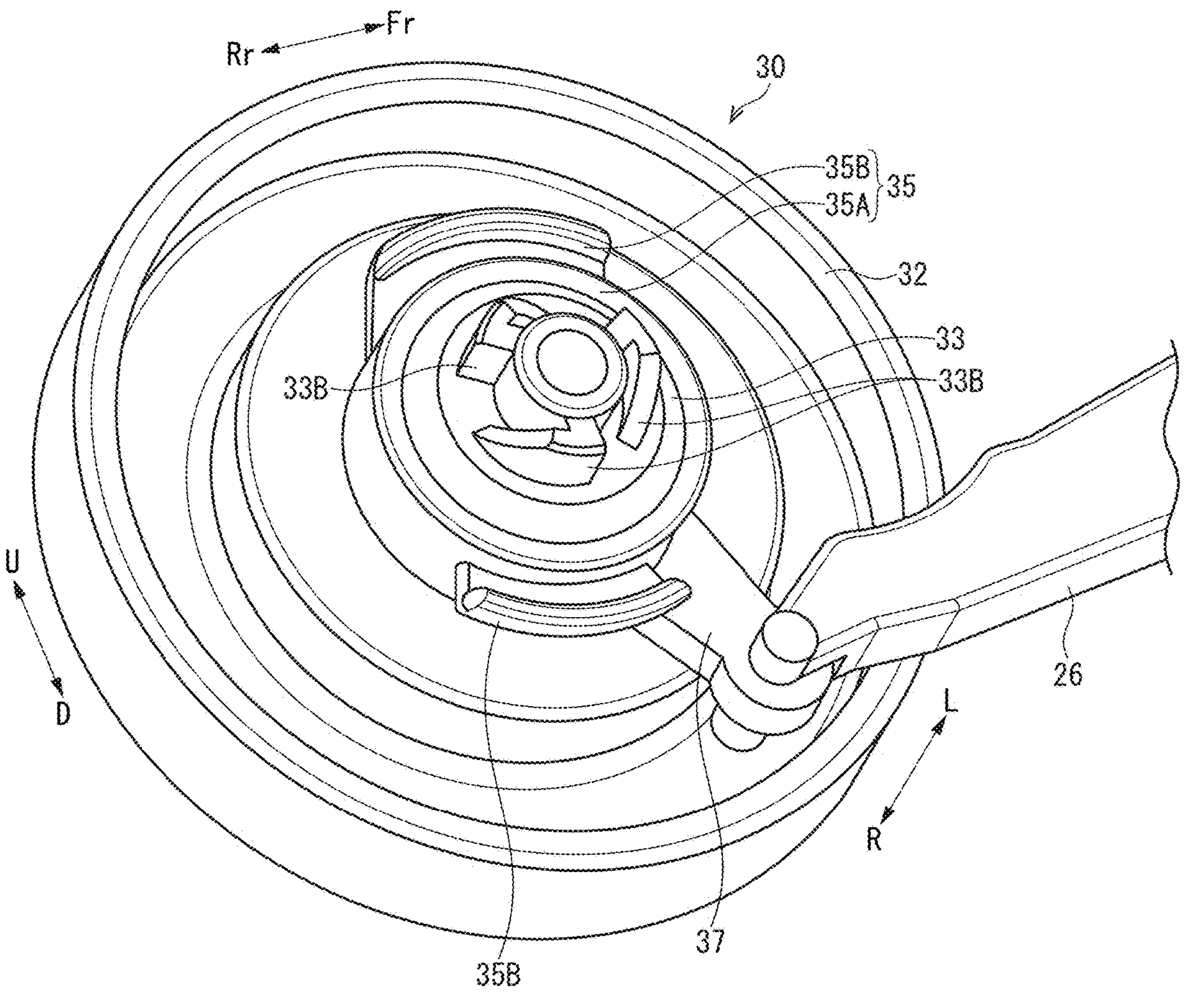
FIG. 5 is a perspective view showing the drive transmission device according to the embodiment of the present disclosure.
Figure 6:
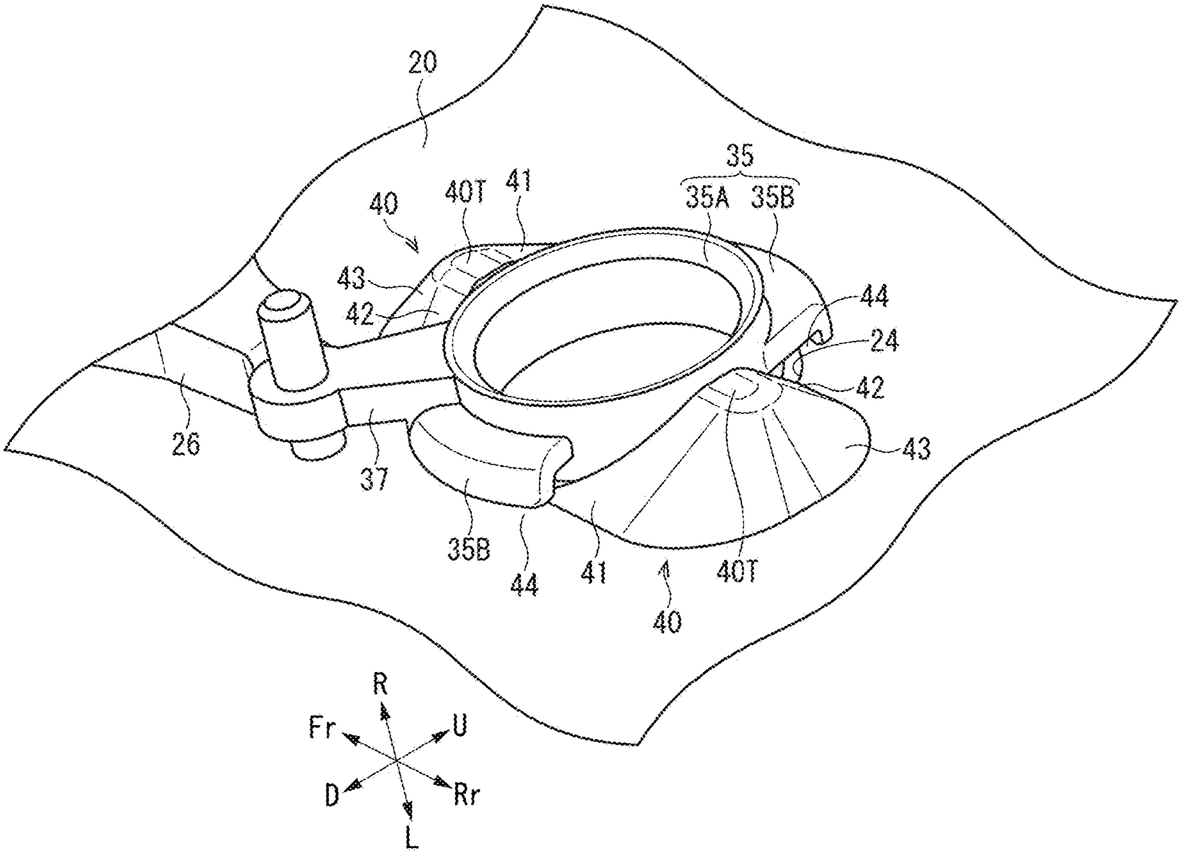
FIG. 6 is a perspective view showing a retracting part arranged at a retracted position in the drive transmission apparatus according to the embodiment of the present disclosure.
Figure 7:
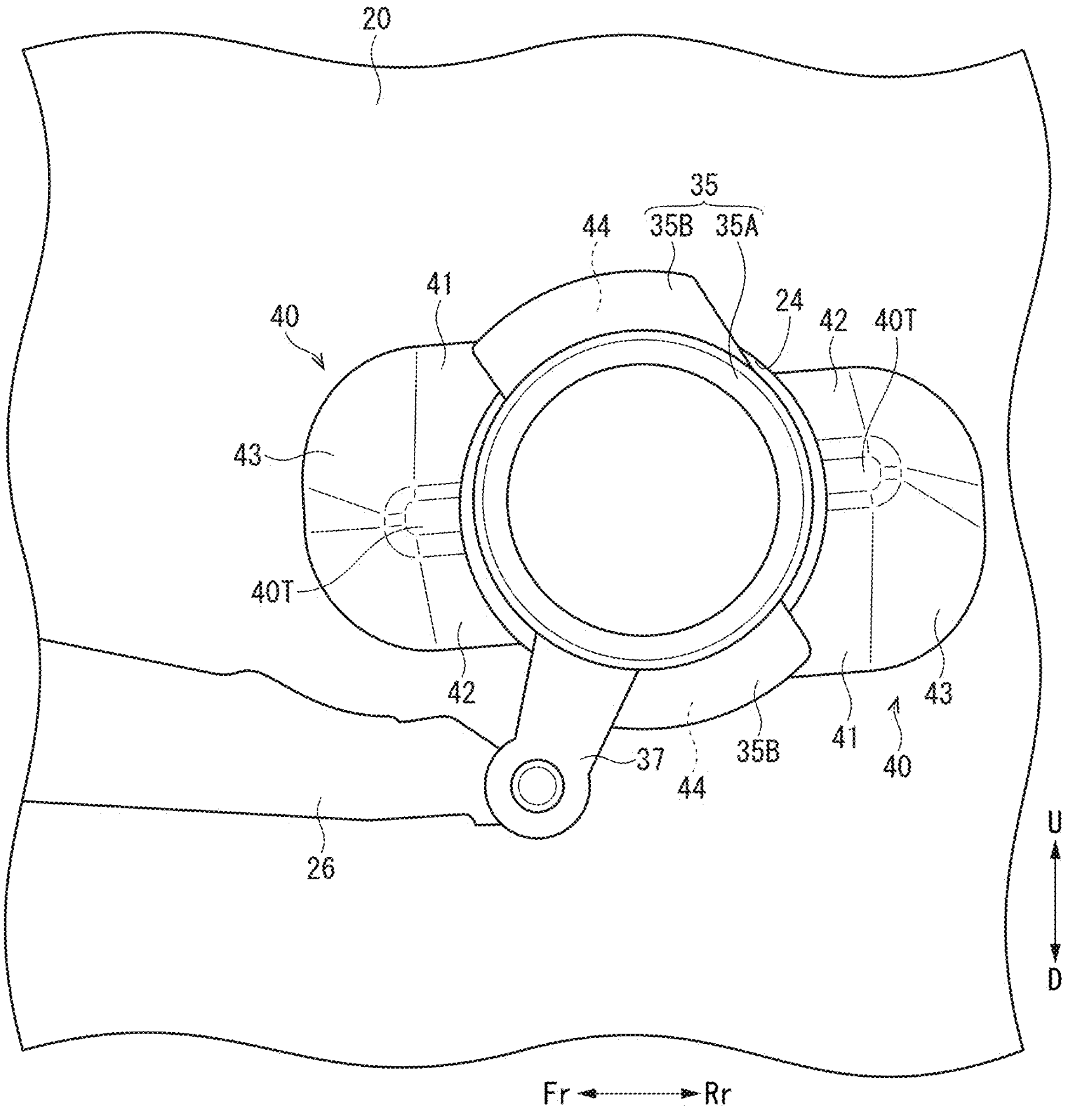
FIG. 7 is a side view showing the retracting part arranged at the retracted position in the drive transmission apparatus according to the embodiment of the present disclosure.

[Drive Transmission Device] Next, with reference to FIG. 2 to FIG. 7, a drive transmission device 30 which transmits a driving force to the drum unit 11 will be described. FIG. 2 is a schematic view (side view) showing the drive transmission device 30 and a main body sheet metal 20. FIG. 3 is a cross-sectional view taken along the line III-III of FIG. 2. FIG. 4 is a perspective view showing a coupling part 33 and the main body sheet metal 20 of the drive transmission device 30. FIG. 5 is a perspective view showing the drive transmission device 30. FIG. 6 is a perspective view showing a retracting part 35 arranged at a retracted position 44. FIG. 7 is a side view showing the retracting part 35 arranged at the retracted position 44.

As shown in FIG. 2, the drive transmission device 30 is arranged so as to face the photosensitive drum 13 (drive transmitted portion) across the main body sheet metal 20 (metal plate) provided inside the apparatus main body 2. The main body sheet metal 20 is made of steel, for example, and supports the drum unit 11, a drive motor 21, and a gear train 22. The drum unit 11 is arranged on the inner surface side of the main body sheet metal 20 (the rear side (left side) in FIG. 2), and is detachably supported by the main body sheet metal 20. A guide rail 23 for guiding the drum unit 11 to an attachment position is formed on the main body sheet metal 20. A through-hole 24 is opened at the rear end portion (attachment position) of the guide rail 23 of the main body sheet metal 20. The drive motor 21 (drive source) is fixed on the inner surface of the main body sheet metal 20, and the output shaft (not shown) penetrates the main body sheet metal 20 from the inside to the outside. The gear train 22 includes a plurality of gears (spur gears and stepped gears) rotatably supported on the outer surface of the main body sheet metal 20. One gear among the gears is engaged with a pinion gear 21A fixed to the output shaft of the drive motor 21.

As shown in FIG. 1, a cover 25 is openably and closeably provided in the apparatus main body 2 in which the drive transmission device 30 and the others are housed. The cover 25 is provided, for example, on the front surface of the apparatus main body 2, and turned around a hinge positioned at the lower end portion. The cover 25 constitutes the front surface of the apparatus main body 2 in a close state, and is opened forward when the toner container 10, the drum unit 11, the developing device 15, and the others are attached and detached.

As shown in FIG. 3, the drive transmission device 30 is arranged between the main body sheet metal 20 and a drive sheet metal 31 (for example, made of steel). The drive transmission device 30 includes a gear part 32, a coupling part 33, a biasing member 34, and a retracting part 35.

<Gear Part> The gear part 32 is a spur gear engaged with the final gear of the gear train 22 (see FIG. 2), and is rotatably supported by a support shaft 36 extending from the drive sheet metal 31 toward the main body sheet metal 20 (see FIG. 3). The gear part 32 is connected to the drive motor 21 via the gear train 22 (see FIG. 2), and rotates around the axis by a driving force of the drive motor 21. The axial center of the support shaft 36 (gear part 32) substantially coincides with the axial center of the through-hole 24 opened in the main body sheet metal 20 (see FIG. 3).

<Coupling Part> As shown in FIG. 3, the coupling part 33 is generally formed into a cylindrical shape, and extends from the axial center of the gear part 32 toward the main body sheet metal 20 (the photosensitive drum 13). The coupling part 33 is made of synthetic resin such as polyacetal, for example, and is integrally molded with the gear part 32, and rotates around the same axis as the gear part 32. A shaft cylindrical portion 33A in which the support shaft 36 is inserted is molded in the axial center of the gear part 32 and the coupling part 33. The coupling part 33 (the distal end portion) penetrates the through-hole 24 opened in the main body sheet metal 20, and is connected to the photosensitive drum 13. More specifically, as shown in FIG. 4, three engagement claws 33B are formed on the distal end surface of the coupling part 33 so as to surround the shaft cylindrical portion 33A. Each engagement claw 33B is engaged with a drum coupling 13A (see FIG. 3) attached to the rotational shaft of the photosensitive drum 13, whereby the coupling part 33 is connected to the photosensitive drum 13 (the photosensitive drum 13 is not shown in FIG. 3).

<Biasing member> As shown in FIG. 3, the biasing member 34 is, for example, a coil spring, and is provided so as to wrap around the outer circumferential surface of the shaft cylindrical portion 33A (and the support shaft 36). The biasing member 34 is provided between the drive sheet metal 31 and the inner surface of the distal end inner surface of the coupling part 33 in a compressed state. The biasing member 34 biases the gear part 32 and the coupling part 33 in a direction close to the photosensitive drum 13. In other words, the coupling part 33 (the distal end portion) is kept connected to the photosensitive drum 13 by being biased by the biasing member 34.

<Retracting Part> The retracting part 35 is made of synthetic resin such as polyacetal, for example, and is formed in a substantially annular shape, through which the coupling part 33 is penetrated. The retracting part 35 into which the coupling part 33 is passed is arranged between the gear part 32 and the main body sheet metal 20. As will be described in detail later, the retracting part 35 is supported around the outer circumferential surface of the coupling part 33, and is rotated around the same axis as the coupling part 33 in a reciprocating manner.

As shown in FIG. 5, the retracting part 35 has a retracting body portion 35A formed in a substantially annular shape and two retracting contact portions 35B projecting radially outward from the retracting body portion 35A. The two retracting contact portions 35B are provided at positions facing each other across the opening of the retracting body portion 35A. Each of the retracting contact portions 35B extends radially from the retracting body portion 35A, and its distal end portion is bent toward the main body sheet metal 20. That is, each of the retracting contact portions 35B is bent in a substantially L-shape.

The retracting part 35 has an arm portion 37 extending radially outward from the retracting body portion 35A. The arm portion 37 is formed longer in the radial direction than the retracting contact portion 35B. One end of a lever 26 is rotatably connected to the distal end of the arm portion 37. The other end of the lever 26 is rotatably coupled to the cover 25 of the apparatus main body 2 (not shown). The lever 26 connects the cover 25 and the retracting part 35, and the reciprocating rotation of the retracting part 35 is interlocked with the opening and closing of the cover 25.

<Inclined Part> As shown in FIG. 4, FIG. 6, and FIG. 7, the main body sheet metal 20 is formed with two inclined parts 40 protruding in a direction (rightward) away from the photosensitive drum 13 (drive transmitted part) across the through-hole 24. The two inclined parts 40 are provided so as to face each other in the front-and-rear direction across the through-hole 24. Each of the two inclined parts 40 is formed by deforming a part of the main body sheet metal 20. For example, each of the two inclined parts 40 is integrally formed with the main body sheet metal 20 by applying drawing to the main body sheet metal 20.

The inclined part 40 is formed in a generally conical shape having a contact inclined surface 41 and a non-contact inclined surface 42. More precisely, the inclined part 40 has a shape such that a cone is generally cut in half by the through-hole 24. The contact inclined surface 41 and the non-contact inclined surface 42 are generally inclined planes, and are connected by a curved surface 43 to constitute the inclined part 40. The contact inclined surface 41 and the non-contact inclined surface 42 are inclined so as to be close to each other as they are away from the photosensitive drum 13, and a joint portion (top portion 40T of the inclined part 40) between the contact inclined surface 41 and the non-contact inclined surface 42 is rounded in a substantially hemispherical shape.

As will be described later in detail, when the retracting part 35 is rotated in a reciprocating manner, the retracting contact portion 35B is in contact with the inclined part 40 of the main body sheet metal 20. The contact inclined surface 41 is a surface with which the retracting part 35 (retracting contact portion 35B) is in contact, and the non-contact inclined surface 42 is a surface with which the retracting part 35 (retracting contact portion 35B) is not in contact. The contact inclined surface 41 is inclined gentler than the non-contact inclined surface 42. As shown in FIG. 6 and FIG. 7, one inclined part 40 has a shape in which the other inclined part 40 is rotated 180 degrees around the center of the through-hole 24, and the positions of the contact inclined surface 41 and the non-contact inclined surface 42 in the two inclined parts 40 are opposite. That is, the two inclined parts 40 are arranged in point symmetry with respect to the center of the through-hole 24.

Figure 8:
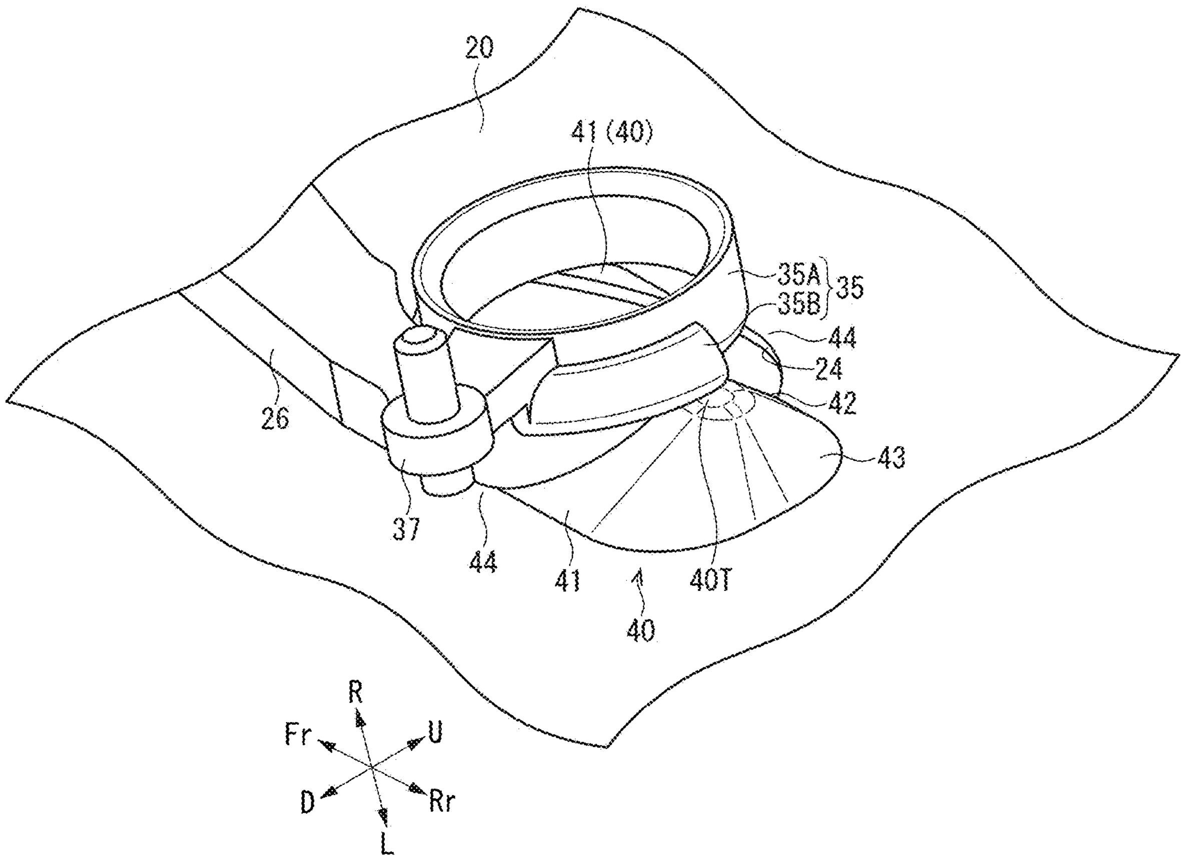
FIG. 8 is a perspective view showing the retracting part arranged at a top portion of an inclined part in the drive transmission apparatus according to the embodiment of the present disclosure.
Figure 9:
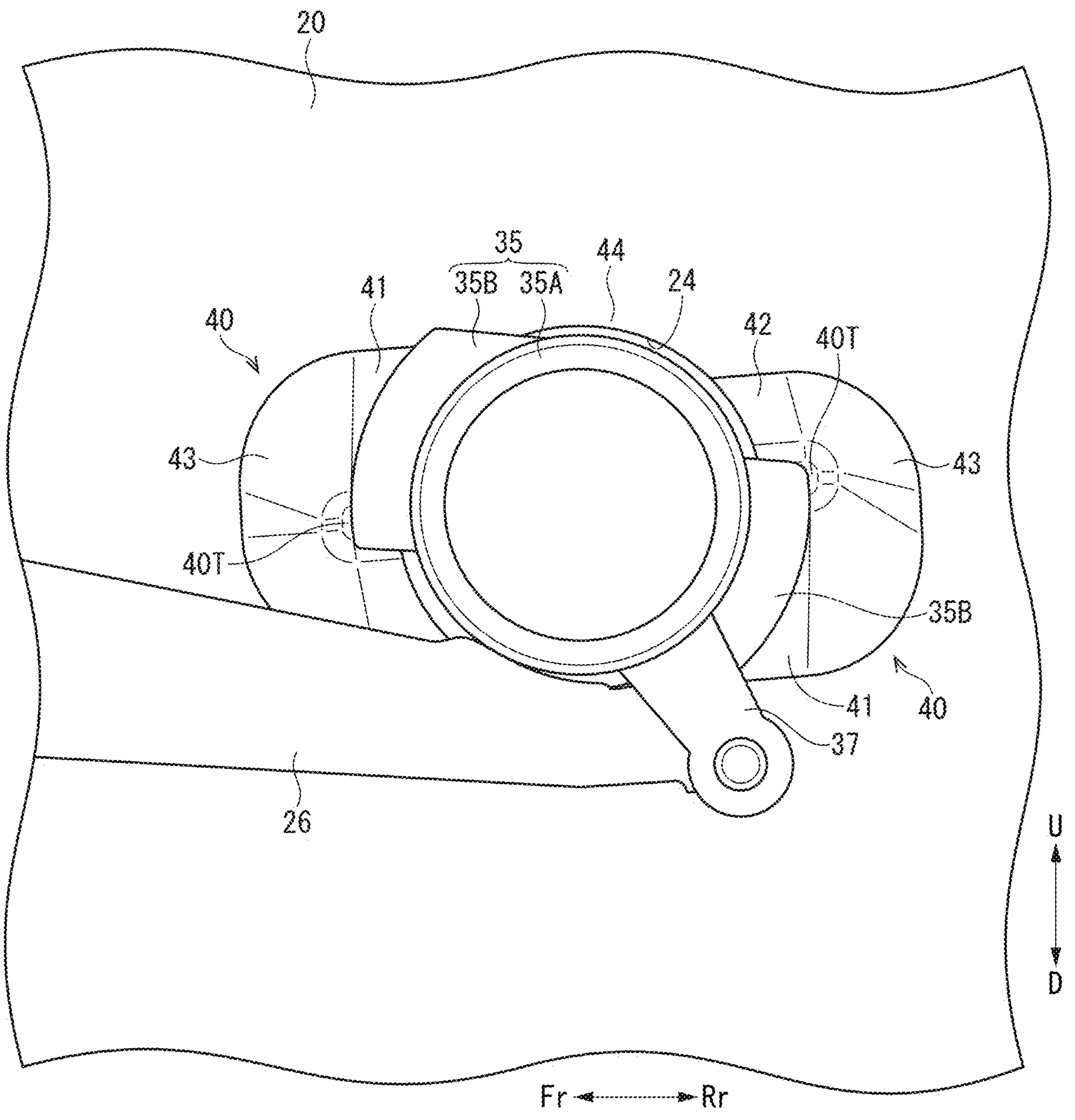
FIG. 9 is a side view showing the retracting part arranged at the top portion of the inclined part in the drive transmission apparatus according to the embodiment of the present disclosure.

[Function of Drive Transmission Device] With reference to FIG. 6 to FIG. 9, the function of the drive transmission device 30 will be described. FIG. 8 is a perspective view showing the retracting part 35 arranged on the top portion 40T of the inclined part 40. FIG. 9 is a side view showing the retracting part 35 arranged on the top portion 40T of the inclined part 40. In this specification, for convenience of explanation, the state in which the image forming process can be executed is referred to as the initial state.

In the initial state, the drum unit 11 is inserted along the guide rail 23 to the attachment position, and the cover 25 of the apparatus main body 2 is closed (see FIG. 1). Each of the retracting body portions 35A of the drive transmission device 30 is in contact with an edge portion of the through-hole 24 in which the inclined part 40 is not formed (see FIG. 6 and FIG. 7) (hereinafter, it will be referred to as "a retracted position 44"). That is, the retracting part 35 of the drive transmission device 30 is not in contact with the two inclined parts 40, but is in contact with the surface of the main body sheet metal 20. The coupling part 33 of the drive transmission device 30 is biased by the biasing member 34, and the coupling part 33 (engagement claws 33B) is pressed against the drum coupling 13A of the photosensitive drum 13 (see FIG. 3). Thus, the photosensitive drum 13 is connected to the drive motor 21 via the drive transmission device 30 and the gear train 22. The driving force (rotational force) of the drive motor 21 is transmitted to the gear part 32 and the coupling part 33 of the drive transmission device 30 through the gear train 22, and is transmitted to the photosensitive drum 13 through the coupling part 33 (engagement claw 33B). As a result, the photosensitive drum 13 rotates around the axis.

When the drum unit 11 is replaced, the drive transmission device 30 (coupling part 33) is separated (uncoupled) from the photosensitive drum 13 (drum coupling 13A). Specifically, when the operator opens the closed cover 25, the rotational force in the opening direction of the cover 25 is transmitted to the retracting part 35 via the lever 26. As shown in FIG. 8 and FIG. 9, the retracting part 35 rotates in one direction (counterclockwise direction in FIG. 8 and FIG. 9) while in contact with the inclined parts 40. Specifically, each of the retracting contact portions 35B rises from the retracted position 44 onto the contact inclined surface 41 of the inclined part 40, and moves (rotates) toward the top portion 40T of the inclined part 40 while in contact with the contact inclined surface 41. As each retracting contact portion 35B rotates in one direction, the retracting part 35 is gradually moved in a direction away from the photosensitive drum 13 (rightward). Then, the retracting part 35 moves the gear part 32 and the coupling part 33 in a direction away from the photosensitive drum 13 against the biasing force of the biasing member 34. Thus, the coupling part 33 is separated from the drum coupling 13A of the photosensitive drum 13. Then, the operator pulls out the drum unit 11 along the guide rail 23, and takes out the drum unit 11 from the apparatus main body 2. When the cover 25 is fully opened, each of the retracting contact portions 35B stops in contact with the top portion 40T of the inclined part 40 (see FIG. 8 and FIG. 9).

When the drum unit 11 is returned to the initial state after the replacement, the drive transmission device 30 (coupling part 33) is connected to the photosensitive drum 13 (drum coupling 13A). Specifically, when the operator inserts the drum unit 11 into the attachment position along the guide rail 23 and closes the opened cover 25, the rotational force in the closing direction of the cover 25 is transmitted to the retracting part 35 via the lever 26. As shown in FIG. 6 and FIG. 7, the retracting part 35 rotates in the other direction (clockwise direction in FIG. 6 and FIG. 7) while in contact with the inclined parts 40. Specifically, each of the retracting contact portions 35B falls off from the top portion 40T of the inclined part 40 onto the contact inclined surface 41, and moves (rotates) toward the retracted position 44 (the surface of the main body sheet metal 20) while in contact with the contact inclined surface 41. As each of the retracting contact portion 35B rotates further in the other direction, the biasing member 34 moves the gear part 32, the coupling part 33, and the retracting part 35 in a direction (leftward) close to the photosensitive drum 13. Thus, the coupling part 33 is connected to the drum coupling 13A of the photosensitive drum 13. When the cover 25 is fully closed, each of the retracting contact portions 35B stops in contact with the retracted position 44 (see FIG. 6 and FIG. 7).

Figure 10:
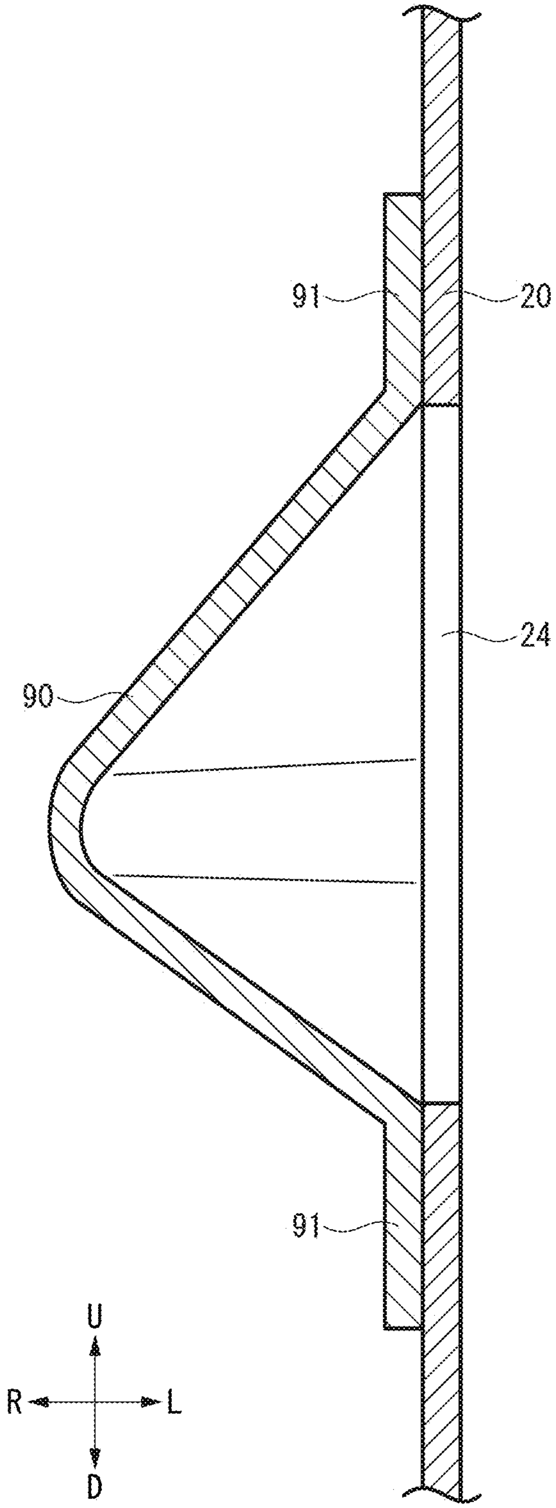
FIG. 10 prior art
FIG. 10 is a cross-sectional view showing a conventional inclined part.

In the drive transmission device 30 according to the present embodiment described above, the two inclined parts 40 are formed by deforming a part of the main body sheet metal 20 (metal plate) so as to protrude in the direction away from the photosensitive drum 13 (drive transmitted portion). If, as shown in FIG. 10, the inclined part 90 as a separate member is attached to the surface of the main body sheet metal 20, a thickness of a fixing piece 91 of the inclined part 90 must be considered in addition to a thickness of the main body sheet metal 20, and the coupling part 33 which is penetrated through the through-hole 24 may become long in the axial direction. However, according to the drive transmission device 30 according to the present embodiment, since the inclined parts 40 are a part of the main body sheet metal 20, a length of the coupling part 33 may be determined only in consideration of a thickness of the main body sheet metal 20 (see FIG. 3 and FIG. 4), and the coupling part 33 can be shortened. As a result, the coupling part 33 can be connected as close as possible to the photosensitive drum 13, and it becomes possible to rotate the photosensitive drum 13 with high accuracy. Further, since the inclined parts 40 are a part of the main body sheet metal 20, a number of parts can be reduced as compared with the case where the conventional inclined part 90 is prepared as a separate part, and in addition, a mounting work to the main body sheet metal 20 can be eliminated. Thus, the manufacturing cost of the drive transmission device 30 (image forming apparatus 1) can be reduced.

In the drive transmission device 30 according to the present embodiment, the two retracting contact portions 35B of the retracting part 35 protrude radially outward from the retracting body portion 35A, and are in contact with the two inclined parts 40 formed across the through-hole 24. According to this configuration, the coupling part 33 can be substantially moved in parallel along the axial direction (the left-and-right direction). As a result, since a posture of the coupling part 33 is stabilized, the photosensitive drum 13 can be coupled and decoupled to the photosensitive drum 13 properly.

Further, according to the drive transmission device 30 according to the present embodiment, since the inclined part 40 is formed in a mountain shape having the contact inclined surface 41 and the non-contact inclined surface 42, a rigidity (mechanical strength) of the inclined part 40 can be improved compared with the case where the inclined part 40 is formed only by the contact inclined surface 41. Thus, the retracting part 35 riding on the inclined part 40 can be firmly supported. Since the non-contact inclined surface 42 has a steeper slope than the contact inclined surface 41, the inclined part 40 can be formed smaller than when the non-contact inclined surface 42 has the same slope as the contact inclined surface 41. Thus, since a space around the inclined part 40 can be secured widely, interference of the arm portion 37 and the lever 26 with the inclined part 40 can be suppressed, and a smooth rotation of the retracting part 35 can be ensured.

In the drive transmission device 30 according to the present embodiment, the retracting part 35 of the drive transmission device 30 is connected to the cover 25 of the apparatus main body 2 via the lever 26. According to this configuration, the opening and closing of the cover 25 can be interlocked with the reciprocating rotation of the retracting part 35. Thus, the coupling part 33 can be automatically decoupled to the photosensitive drum 13 by opening the cover 25, and the coupling part 33 can be automatically coupled to the photosensitive drum 13 by closing the cover 25.

In the drive transmission device 30 according to the present embodiment, the gear part 32 and the coupling part 33 are integrally molded, but the separately formed gear part 32 and coupling part 33 may be coupled and integrated (not shown).

Further, in the drive transmission device 30 according to the present embodiment, the contact inclined surface 41 of the inclined part 40 has a gentler slope than the non-contact inclined surface 42, but the contact inclined surface 41 and the non-contact inclined surface 42 may have the same slope (not shown). Further, the non-contact inclined surface 42 may be a plane perpendicular to the main body sheet metal 20, and only the contact inclined surface 41 may be an inclined plane (not shown).

In the drive transmission device 30 according to the present embodiment, the inclined part 40 is formed in a substantially conical shape (mountain shape), but the present disclosure is not limited thereto. For example, a pair of cuts (not shown) may be formed in parallel on the main body sheet metal 20, and a substantially V-shaped (or substantially A-shaped) inclined part (not shown) may be formed by extruding between the pair of cuts. In this case, the contact inclined surface 41 may have a gentler slope than the non-contact inclined surface 42, or the contact inclined surface 41 and the non-contact inclined surface 42 may have the same slope (not shown). In addition, a substantially U-shaped cut (not shown) may be formed in the main body sheet metal 20, and an area surrounded by the cut may be extruded to form the inclined part (not shown) having only the contact inclined surface 41 while omitting the non-contact inclined surface 42.

In the drive transmission device 30 according to the present embodiment, the two inclined parts 40 are formed across the through-hole 24, but the present disclosure is not limited thereto. For example, three or more inclined parts 40 may be formed so as to surround the through-hole 24 (not shown). Further, a number and a position of the retracting contact portion 35B of the retracting part 35 may be adjusted in accordance with a number and a position of the inclined parts 40 (not shown).

Further, in the drive transmission device 30 according to the present embodiment, the retracting part 35 includes the retracting body portion 35A and two retracting contact portions 35B, but the present disclosure is not limited thereto, and for example, the retracting part 35 may be formed in an elliptical shape, and the long diameter portions may be used as the two retracting contact portions (not shown).

Further, although the drive transmission device 30 according to the present embodiment transmits a driving force to the photosensitive drum 13 as an example of the drive transmitted portion, the present disclosure is not limited thereto. The drive transmission device 30 may transmit a driving force to a drive transmitted portion rotating around an axis, such as a stirring member of the toner container 10 or a developing roller of the developing device 15 (both not shown).

In the image forming apparatus 1 according to the present embodiment, the retracting part 35 is connected to the cover 25 via the lever 26, but the present disclosure is not limited thereto. For example, the lever 26 may not be connected to the cover 25, and an operator may operate the lever 26 to rotate the retracting part 35 in a reciprocating manner after opening the cover 25 (not shown). Another image forming apparatus may omit the lever 26 and include a sensor for detecting the opening and closing of the cover 25 and a motor for rotating the retracting part 35 in a reciprocating manner based on the detection result of the sensor (not shown).

In the description of the present embodiment, as an example, the image forming apparatus 1 is a printer, but it is not limited thereto, and may be, for example, a copying machine or a facsimile machine.

It should be noted that the description of the above-described embodiment shows one aspect of the drive transmission apparatus and the image forming apparatus according to the present disclosure, and the technical range of the present disclosure is not limited to the above-described embodiment. The present disclosure may be varied, replaced, and modified without departing from the spirit of the technical thought, and the scope of the claims includes all embodiments which may be included within the scope of the technical thought.

The invention claimed is:

1. A drive transmission device arranged to face a drive transmitted portion across a metal plate, the drive transmission device comprising:

a gear part which is coupled to a drive source, and rotates around an axis by a driving force of the drive source;

a coupling part which is formed into a cylindrical shape, penetrates a through-hole of the metal plate, is connected to the drive transmitted portion, and rotates around the same axis of the gear part;

a biasing member which biases the gear part and the coupling part to a direction close to the drive transmitted portion; and a retracting part which is formed into an annular shape through which the coupling part penetrates, and rotates around the same axis as the coupling part in a reciprocating manner, wherein the metal plate has at least two inclined parts which are arranged across the through-hole, and protrude in a direction away from the drive transmitted portion, the inclined part being formed by deforming a part of the metal plate, and the retracting part rotates in one direction while in contact with the inclined part to move the gear part and the coupling part in the direction away from the drive transmitted portion against a biasing force of the biasing member.

2. The drive transmission device according to claim 1, wherein the coupling part is integrally molded with the gear part.

3. The drive transmission device according to claim 1, wherein the retracting part has a retracting body portion formed into an annular shape, and at least two retracting contact portions protruding radially outward from the retracting body portion and capable of being in contact with the inclined part.

4. The drive transmission device according to claim 3, wherein the retracting contact portion has an L-shaped cross section in which a distal end portion of the retracting contact portion is bent toward the metal plate.

5. The drive transmission device according to claim 1, wherein the inclined part is formed into a mountain shape having a contact inclined surface with which the retracting part is capable of being in contact and a non-contact inclined surface with which the retracting part is not in contact with, and the non-inclined surface is steeper than the inclined surface.

6. An image forming apparatus comprising the drive transmission device according to claim 1.

7. The image forming apparatus according to claim 6, comprising:

an apparatus main body in which the drive transmission device is housed;

a cover provided in the apparatus main body openably and closeably; and a lever which connects the cover to the retracting part of the drive transmission device, wherein when the closed cover is opened, the retracting part rotates in one direction while in contact with the inclined part to move the gear part and the coupling part in the direction away from the drive transmitted portion, and when the opened cover is closed, the retracting part rotates in the other direction while in contact with the inclined part, and the biasing member moves the coupling part and the retracting part in a direction close to the drive transmitted portion.

* * * * *